United States Patent
Fujisawa et al.

(10) Patent No.: US 8,829,104 B2
(45) Date of Patent: Sep. 9, 2014

(54) STYRENE-BASED RESIN COMPOSITION, AND RESIN MOLDED ARTICLE COMPRISING SAME

(75) Inventors: Tomoyuki Fujisawa, Tokyo (JP); Mihoko Yamamoto, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 9 days.

(21) Appl. No.: 13/635,765

(22) PCT Filed: Mar. 18, 2011

(86) PCT No.: PCT/JP2011/056566
§ 371 (c)(1), (2), (4) Date: Sep. 18, 2012

(87) PCT Pub. No.: WO2011/115253
PCT Pub. Date: Sep. 22, 2011

(65) Prior Publication Data
US 2013/0012646 A1     Jan. 10, 2013

(30) Foreign Application Priority Data
Mar. 19, 2010   (JP) ................. 2010-064399

(51) Int. Cl.
| | |
|---|---|
| C08L 51/00 | (2006.01) |
| C09B 67/00 | (2006.01) |
| C08L 33/18 | (2006.01) |
| C08L 25/12 | (2006.01) |
| C08L 55/02 | (2006.01) |
| C08L 33/06 | (2006.01) |

(52) U.S. Cl.
CPC ............. *C08L 33/06* (2013.01); *C08L 33/18* (2013.01); *C08L 25/12* (2013.01); *C08L 55/02* (2013.01); *C08L 51/003* (2013.01); *C08L 279/02* (2013.01)
USPC .......................................... 524/504; 524/502

(58) Field of Classification Search
USPC .......................................................... 524/504
See application file for complete search history.

(56) References Cited

U.S. PATENT DOCUMENTS

| 6,512,077 B1 | 1/2003 | Miyamoto et al. |
| 2008/0194756 A1 | 8/2008 | DeRudder |
| 2010/0069540 A1 * | 3/2010 | Yoo et al. ............. 524/101 |

FOREIGN PATENT DOCUMENTS

| JP | 9-255844 A | 9/1997 | |
| JP | 10-298373 A | 11/1998 | |
| JP | 11-1600 A | 1/1999 | |
| JP | 2000-344994 A | 12/2000 | |
| JP | 2001-181468 A | 7/2001 | |
| JP | 2001-200131 A | 7/2001 | |
| JP | 2002-201330 A | 7/2002 | |
| JP | 2002-206039 A | 7/2002 | |
| JP | 2003-165888 A | 6/2003 | |
| JP | 2003-201384 A | 7/2003 | |
| JP | 2004-43562 A | 2/2004 | |
| JP | 2004043562 A * | 2/2004 | ........... C08L 51/04 |
| JP | 2008-179730 A | 8/2008 | |
| JP | 2008-291158 A | 12/2008 | |
| JP | 2009-144008 A | 7/2009 | |
| JP | 2009144008 A * | 7/2009 | |
| WO | WO 00/58402 A1 | 10/2000 | |

OTHER PUBLICATIONS

Supplementary European Search Report for corresponding European Patent Application No. 11756436.9, dated Mar. 12, 2013.
International Search Report, dated Jun. 21, 2012, issued in PCT/JP2011/056566.

* cited by examiner

*Primary Examiner* — Hui Chin
(74) *Attorney, Agent, or Firm* — Birch, Stewart, Kolasch & Birch, LLP

(57) ABSTRACT

Disclosed is a styrene-based resin composition that comprises 5-20 parts by mass of (D) a fire retardant per 100 parts by mass of a resin composition (1) that comprises 30-51 mass % of (A) a graft copolymer obtained by graft polymerization of a diene rubber polymer with an aromatic vinyl monomer and an unsaturated nitrile monomer, 10-55 mass % of (B) a copolymer comprising two or more monomers selected from among aromatic vinyl monomers, unsaturated nitrile monomers and unsaturated carboxylic acid alkyl ester monomers, and 15 to 39% by mass of a copolymer (C) comprising one kind of unsaturated carboxylic acid alkyl ester monomers, or two or more unsaturated carboxylic acid alkyl ester monomers, ((A)+(B)+(C)=100 mass %), wherein the diene rubber polymer constitutes 15-25 mass % of the resin composition (1).

7 Claims, No Drawings

STYRENE-BASED RESIN COMPOSITION, AND RESIN MOLDED ARTICLE COMPRISING SAME

TECHNICAL FIELD

The present invention relates to a styrene-based resin composition having high flame retardancy, falling dart impact resistance, weld strength, Charpy impact strength, and color developability, and a resin molded article comprising the same.

BACKGROUND ART

Conventionally, flame retardant styrene-based resins have fabricability, a good balance of mechanical properties, and excellent electric insulation, and therefore they are used in wider fields such as electrical and electronic equipment and OA equipment. On the other hand, recently, a trend toward suppression in discharge of volatile organic compounds (Volatile Organic Compounds: VOC) has promoted use of non-coated resins for housings used in the fields of electrical and electronic equipment and OA equipment. For this reason, there has been a desire for resins that have high designability that can address various color tones, for example, can be colored in a vivid color or a deep color. It has previously been reported that a transparent flame retardant resin composition has high coloring physical properties and designability in which a phosphoric acid ester-based flame retardant is compounded with a rubber-reinforced styrene-based resin obtained by copolymerization of an unsaturated carboxylic acid alkyl ester (for example, see Patent Literatures 1 to 5). A transparent rubber-reinforced styrene-based resin obtained by copolymerization of an unsaturated carboxylic acid alkyl ester is used as a base resin, thus obtained transparent flame retardant resin composition has high coloring properties and designability. Because the unsaturated carboxylic acid alkyl ester is compounded, however, stability of the flame retardancy and the mechanical properties, particularly the falling dart impact resistance, weld strength, and Charpy impact strength are insufficient, and further improvement thereof has been desired. Moreover, a resin composition comprising a rubber containing graft copolymer, a copolymer consisting of a monomer mixture containing a methyl methacrylate monomer, and a flame retardant compounded with these has been reported (for example, see Patent Literature 6). The styrene-based resin disclosed in Patent Literature 6 demonstrates an effect in the flame retardancy, designability, and scratch resistance, but stability of the flame retardancy and mechanical properties, particularly the falling dart impact resistance, weld strength, Charpy impact strength, and the like are inferior. Additionally, the electrical and electronic equipment using this styrene-based resin and the like do not show satisfactory results in a product drop practical test. Accordingly, further improvement has been desired. Meanwhile, a resin composition in which scratch resistance, designability, and impact resistance are improved, and no flame retardant is compounded has been reported (for example, see Patent Literature 7). Unfortunately, the falling dart impact resistance, weld strength, and the like of this resin composition do not show satisfactory results in the product drop practical test, and therefore further improvement has been desired.

PRIOR ART

Patent Literature

Patent Literature 1: JP 2000-344994 A
Patent Literature 2: JP 2001-200131 A
Patent Literature 3: JP 2002-201330 A
Patent Literature 4: JP 2002-206039 A
Patent Literature 5: JP 2003-201384 A
Patent Literature 6: JP 2008-179730 A
Patent Literature 7: JP 2008-291158 A

SUMMARY OF INVENTION

Technical Problem

An object of the present invention is to provide a styrene-based resin composition which excels in flame retardancy, and at the same time in falling dart impact resistance, weld strength, Charpy impact strength, and color developability, and a resin molded article comprising the same.

Technical Solution

As a result of extensive research to solve the problems, the present inventors have found out a material which can solve the problems, and based on this knowledge, have completed the present invention.

Namely, the present inventors have completed a styrene-based resin composition which excels in flame retardancy, and at the same time in falling dart impact resistance, weld strength, Charpy impact strength, and color developability by adding 5 to 20 parts by mass of a flame retardant (D) to 100 parts by mass of a resin composition (1) comprising: 30 to 51% by mass of a graft copolymer (A) obtained by graft polymerizing a diene-based rubbery polymer with an aromatic vinyl-based monomer and an unsaturated nitrile monomer, 10 to 55% by mass of a copolymer (B) comprising two or more of monomers selecting from the group consisting of aromatic vinyl-based monomers, unsaturated nitrile monomers, and unsaturated carboxylic acid alkyl ester monomers, and 15 to 39% by mass of a copolymer (C) comprising one kind of unsaturated carboxylic acid alkyl ester monomers, or two or more unsaturated carboxylic acid alkyl ester monomers (wherein (A)+(B)+(C)=100% by mass), and further controlling a proportion of the diene-based rubbery polymer to the resin composition (1) to 15 to 25% by mass.

Namely, the present invention is as follows:

[1] A styrene-based resin composition comprising a resin composition (1) and 5 to 20 parts by mass of a flame retardant (D) based on 100 parts by mass of the resin composition (1), wherein the resin composition (1) comprising 30 to 51% by mass of a graft copolymer (A) obtained by graft polymerizing a diene-based rubbery polymer with an aromatic vinyl-based monomer and an unsaturated nitrile monomer, 10 to 55% by mass of a copolymer (B) comprising two or more of monomers selecting from the group consisting of aromatic vinyl-based monomers, unsaturated nitrile monomers, and unsaturated carboxylic acid alkyl ester monomers, and 15 to 39% by mass of a copolymer (C) comprising one kind of unsaturated carboxylic acid alkyl ester monomers, or two or more unsaturated carboxylic acid alkyl ester monomers (wherein (A)+(B)+(C)=100% by mass), and wherein a proportion of the diene-based rubbery polymer to the resin composition (1) is 15 to 25% by mass.

[2] The styrene-based resin composition according to [1], wherein a falling dart impact 50% destruction energy according to JIS K7211-1976 of a molded product comprising said styrene-based resin composition and having a thickness of 2.5 mm is 4.0 J or more.

[3] The styrene-based resin composition according to [1] or [2], wherein a proportion of a unit component derived from the aromatic vinyl-based monomer (As) in the components of the graft copolymer (A) from which the diene-based rubbery components are excluded is 60 to 90% by mass, a proportion of a unit component derived from the aromatic vinyl-based monomer (Bs) in the copolymer (B) is 60 to 90% by mass, and a difference (|As−Bs|) between the proportion of the unit component derived from the aromatic vinyl-based monomer (As) and the proportion of the unit component derived from the aromatic vinyl-based monomer (Bs) is 0 to 5% by mass.

[4] The styrene-based resin composition according to any one of [1] to [3], wherein the component (C) is a copolymer obtained by copolymerizing a methyl methacrylate monomer and a methyl acrylate monomer.

[5] The styrene-based resin composition according to [4], wherein a proportion of the methyl acrylate monomer contained in the copolymer (C) is 0.5 to 15% by mass.

[6] The styrene-based resin composition according to any one of [1] to [5], wherein the resin composition (1) comprises 1 to 12% by mass of aromatic polycarbonate (E), wherein (A)+(B)+(C)+(E)=100% by mass.

[7] A resin molded article comprising the styrene-based resin composition according to any one of [1] to [6].

[8] The resin molded article according to [7], wherein the resin molded article is molded at a metal mold temperature of 60 to 90° C.

Advantageous Effects of Invention

The styrene-based resin composition of the present invention and resin molded article thereof excel in flame retardancy, as well as color developability, and mechanical strength, particularly falling dart impact resistance, weld strength, and Charpy impact strength.

DESCRIPTION OF EMBODIMENTS

The graft copolymer (A) in the present invention is obtained by graft polymerizing a diene-based rubbery polymer with an aromatic vinyl-based monomer and an unsaturated nitrile monomer. Examples of the diene-based rubbery polymer include conjugated diene-based rubbers such as polybutadiene, butadiene-styrene copolymers, butadiene-acrylonitrile copolymers, butadiene-acrylic copolymers, styrene-butadiene-styrene block copolymers, polyisoprene, styrene-isoprene copolymers, and styrene-isoprene-butadiene copolymers, and hydrogenated products thereof. These can be used alone, or two or more thereof can be used in combination. Among these, preferred diene-based rubbery polymers are polybutadiene, polyisoprene, butadiene-styrene copolymers, butadiene-acrylonitrile copolymers, and butadiene-acrylic copolymers, and particularly preferred are polybutadiene, polyisoprene, butadiene-styrene copolymers, styrene-isoprene copolymers, styrene-isoprene-butadiene copolymers, butadiene-acrylonitrile copolymers, and butadiene-acrylic copolymers. Use of these can provide a styrene-based resin composition having high mechanical strength and color developability and resin molded article thereof.

Examples of the aromatic vinyl-based monomer in the present invention include styrene, α-methylstyrene, o-methylstyrene, p-methylstyrene, ethylstyrene, p-t-butylstyrene, and vinylnaphthalene. Among these, preferred aromatic vinyl-based monomers are styrene and α-methylstyrene. These can be used alone, or two or more thereof can be used in combination.

Examples of the unsaturated nitrile monomer in the present invention include acrylonitrile, methacrylonitrile, and ethacrylonitrile. Among these, preferred unsaturated nitrile monomer is acrylonitrile. These can be used alone, or two or more thereof can be used in combination.

The graft copolymer (A) can be obtained by graft polymerizing the aromatic vinyl-based monomer, the unsaturated nitrile monomer, and other monomer copolymerizable with the aromatic vinyl-based monomer.

The copolymer (B) can be obtained by copolymerizing the aromatic vinyl-based monomer, the unsaturated nitrile monomer, and other monomer copolymerizable with the aromatic vinyl-based monomer.

Examples of the other monomer include acrylic acid esters such as methyl acrylate, ethyl acrylate, and butyl acrylate; similar substitution products, methacrylic acid esters such; acrylic acids such as acrylic acid and methacrylic acid; N-substituted maleimide-based monomers such as N-phenylmaleimide and N-methylmaleimide; and glycidyl group containing monomers such as glycidyl methacrylate. Among these, particularly preferred are methyl acrylate, ethyl acrylate, butyl acrylate, methyl methacrylate, N-phenylmaleimide, and glycidyl methacrylate.

However, in the case where the above-mentioned other monomer is graft copolymerized with the graft copolymer (A), and in the case where the above-mentioned other monomer is copolymerized with the copolymer (B), the other monomer is used in the range in which the effects of the present invention are not impaired. A preferred amount of the other monomer is 0 to 40% by mass based on the graft copolymer (A) and based on the copolymer (B), respectively.

In the present invention, from the viewpoint of the color developability, the proportion of a unit component derived from the aromatic vinyl-based monomer (As) in the components of the graft copolymer (A) from which the diene-based rubbery polymer components are excluded on the basis of calculation is preferably 60 to 90% by mass, more preferably 70 to 85% by mass, and particularly preferably 75 to 85% by mass. Moreover, from the viewpoint of the color developability, the proportion of a unit component derived from the aromatic vinyl-based monomer (Bs) in the copolymer (B) is preferably 60 to 90% by mass, more preferably 75 to 85% by mass, and particularly preferably 77 to 83% by mass. The difference (|As−Bs|) between the proportion of the unit component derived from the aromatic vinyl-based monomer (As) and the proportion of the unit component derived from the aromatic vinyl-based monomer (Bs) is preferably 0 to 5% by mass, and more preferably 0 to 3% by mass because a desired color tone is easier to obtain.

The proportion of the aromatic vinyl compound unit is detected by a Fourier transform infrared spectrophotometer (hereinafter, abbreviated to an FT-IR in some cases). As a sample for the FT-IR, a 0.01 to 0.08 μm film produced by compression molding the graft copolymer (A), and a 0.01 to 0.08 μm film produced by compression molding the copolymer (B), respectively.

As the FT-IR, an FT/IR-7000 made by JASCO Corporation is used. A 0.01 to 0.08 μm film produced by compression molding the copolymer (B), for example, is used as the sample. The Bs is determined from the absorbance (A1) at 2262 cm$^{-1}$, the peak absorbance (A2) at 2238 to 2242 cm$^{-1}$, the absorbance (A3) at 2222 cm$^{-1}$, the absorbance (E1) at 1792 cm$^{-1}$, the peak absorbance (E2) at 1734 to 1738 cm$^{-1}$, the absorbance (E3) at 1661 cm$^{-1}$, the absorbance (S1) at 1617 cm$^{-1}$, the peak absorbance (S2) at 1600 to 1606 cm$^{-1}$, and the absorbance (S3) at 1575 cm$^{-1}$ by the following equation (I):

$$Bs = 1.0/(A+E+1.0) \times 100 \quad \text{Equation (I)}$$

wherein $A = AA/SS \times 0.27599$, $E = EE/SS \times 0.0438 + 0.005$, $AA = A2 - (A1-A3) \times$ (wave number of $A2$ − wave number of $A3$)/(wave number of $A1$ − wave number of $A3$) − $A3$, $SS = S2 - (S1-S3) \times$ (wave number of $S2$ − wave number of $S3$)/(wave number of $S1$ − wave number of $S3$) − $S3$, and $EE = E2 - (E1-E3) \times$ (wave number of $E2$ − wave number of $E3$)/(wave number of $E1$ − wave number of $E3$) − $E3$ A 0.01 to 0.08 μm film produced by compression molding the graft copolymer (A), for example, is used as the sample. The As is determined from A1, A2, A3, S1, S2, and S3 by the following equation (II):

$$As = 1.0/(A+1.0) \times 100 \qquad \text{Equation (II)}$$

wherein $A = AA/SS \times 0.27599$, $AA = A2 - (A1-A3) \times$ (wave number of $A2$ − wave number of $A3$)/(wave number of $A1$ − wave number of $A3$) − $A3$, and $SS = S2 - (S1-S3) \times$ (wave number of $S2$ − wave number of $S3$)/(wave number of $S1$ − wave number of $S3$) − $S3$ The proportion of the aromatic vinyl compound unit is determined by the Fourier transform infrared spectrophotometer (FT-IR) by an internal standard method using a mathematical expression. In the internal standard method, an internal standard substance having a predetermined concentration is added together with a standard sample used for a calibration curve. The ratio of the peak absorbance of the standard sample to the peak absorbance of the internal standard substance is taken. The relationship between the relative ratio and the concentration of the standard sample is plotted as a calibration curve. The coefficients "0.27599," "0.0438," "0.005," and the like are coefficients determined by the internal standard method when the "FT/IR-7000 made by JASCO Corporation" is used.

In the present invention, the volume average particle size of the diene-based rubbery polymer in the graft copolymer (A) is preferably 0.1 to 1.2 μm, more preferably 0.15 to 0.8 μm, still more preferably 0.15 to 0.6 μm, and particularly preferably 0.2 to 0.4 μm from the viewpoint of a balance among the mechanical strength, the fabricability, and the appearance of the molded product.

The graft rate in the graft copolymer (A) is preferably adjusted according to the refractive index of the mixture of the copolymer (B) and the component (C). The graft rate is preferably 10 to 150% by mass, more preferably 20 to 110% by mass, and still more preferably 25 to 60% by mass from the viewpoint of the mechanical strength and the moldability. The graft rate is defined as a mass proportion of monomers graft-copolymerized to a rubbery polymer to the rubbery polymer. The measurement method is as follows. A polymer produced by a polymerization reaction is dissolved in acetone, and separated into components soluble in acetone and components insoluble in acetone by a centrifuge. At this time, the components soluble in acetone are components that do not undergo a graft reaction in the copolymers subjected to the polymerization reaction (non-grafted components), and the components insoluble in acetone is the rubbery polymer and components grafted to the rubbery polymer (grafted component). The value obtained by subtracting the mass of the rubbery polymer from the weight of the components insoluble in acetone is determined as the weight of the grafted components. Accordingly, the graft rate can be determined from these values.

The refractive index of the rubbery polymer is preferably 1.51 to 1.54 at 20° C. to be commensurate with the refractive index of the mixture of the copolymer (B) and the component (C).

In the present invention, the proportion of the diene-based rubbery polymer in the resin composition (1) is 15 to 25% by mass, and preferably 15 to 22% by mass. The proportion is more preferably 16 to 20% by mass. If the proportion of the diene-based rubbery polymer is within the range, the falling dart impact resistance and the color developability are provided in a good balance.

The resin composition (1) in the present invention comprises the graft copolymer (A), the copolymer (B), and the component (C), or comprises the graft copolymer (A), the copolymer (B), the component (C), and an aromatic polycarbonate (E).

The content of the graft copolymer (A) in the resin composition (1) is 30 to 51% by mass, and preferably 35 to 45% by mass. If a content of the graft copolymer (A) is within this range, a resin having a specific content of a rubber is obtained in which the falling dart impact resistance and the color developability are provided in a good balance.

The copolymer (B) in the present invention is obtained by copolymerizing two or more selected from the group consisting of aromatic vinyl-based monomers, unsaturated nitrile monomers, and unsaturated carboxylic acid alkyl ester monomers. Examples of the unsaturated carboxylic acid alkyl ester monomers include alkyl methacrylates such as methyl methacrylate, cyclohexyl methacrylate, methylphenyl methacrylate, and isopropyl methacrylate; and alkyl acrylates such as methyl acrylate, ethyl acrylate, butyl acrylate, and 2-ethylhexyl acrylate. Preferred are methyl methacrylate, ethyl acrylate, butyl acrylate, 2-ethylhexyl acrylate, and the like, and more preferred are butyl acrylate and methyl methacrylate. Most preferred is n-butyl acrylate.

The content of the copolymer (B) in the resin composition (1) is 10 to 55% by mass, and preferably 15 to 50% by mass. If a content of the copolymer (B) is within the range, a resin having high mechanical strength is obtained.

The component (C) in the present invention is a copolymer comprising one kind of unsaturated carboxylic acid alkyl ester monomers, or two or more unsaturated carboxylic acid alkyl ester monomers. Examples of the unsaturated carboxylic acid alkyl ester monomer include alkyl methacrylates such as methyl methacrylate, cyclohexyl methacrylate, methylphenyl methacrylate, and isopropyl methacrylate; and alkyl acrylates such as methyl acrylate, ethyl acrylate, butyl acrylate, and 2-ethylhexyl acrylate. Among these, preferred are methyl methacrylate and methyl acrylate.

In the case where the component (C) is a methyl methacrylate-methyl acrylate copolymer, the content of the methyl acrylate monomers in the copolymer is preferably 0.5 to 15% by mass, and more preferably 0.5 to 10% by mass from the viewpoint of the transparency.

The graft copolymer (A), the copolymer (B), and the component (C) can be produced by a known method such as emulsion polymerization, bulk polymerization, suspension polymerization, suspension bulk polymerization, and solution polymerization.

The content of the component (C) in the resin composition (1) is 15 to 39% by mass, preferably 15 to 35% by mass, and more preferably 20 to 35% by mass. If a content of the component (C) is within this range, stable color developability and flame retardancy are obtained. Moreover, a resin having high falling dart impact resistance is obtained. The related art also has reported a combination of the graft copolymer (A), the copolymer (B), and the component (C). However, from the viewpoint of placing importance on the color developability, only the compositions containing the component (C) in a relatively large content existed, and did not provide satisfactory color developability and flame retardancy in the case that the component (C) was contained in a relatively small content, although satisfactory color developability and flame retardancy can be provided in the present application in which the component (C) is contained in a relatively small content. In this application, the content of the component (C) is thus reduced compared to that in the related art, and a resin composition which excels in color developability, flame retardancy, falling dart impact resistance, and Charpy impact strength was successfully developed.

The flame retardant (D) in the present invention means a compound that is liquid or solid at normal temperature, and can give flame retardancy to a resin by addition of said compound. Examples thereof include flame retardants such as phosphorus flame retardants such as organic phosphorus compounds, red phosphorus, inorganic phosphoric acid salts, halogen flame retardants, silica flame retardants, and silicone flame retardants.

Examples of the organic phosphorus compounds include phosphoric acid ester compounds and condensed phosphoric acid ester compounds, and, for example, include phosphoric acid esters such as trimethyl phosphate, triethyl phosphate, tripropyl phosphate, tributyl phosphate, tripentyl phosphate, trihexyl phosphate, tricyclohexyl phosphate, triphenyl phosphate, tricresyl phosphate, trixylenyl phosphate, dimethylethyl phosphate, methyl dibutyl phosphate, ethyl dipropyl phosphate, hydroxyphenyldiphenyl phosphate and compounds thereof modified with a variety of substituents; or halogen-containing acid esters such as tris(chloroethyl) phosphate, bis(2,3-dibromopropyl)2,3-dichloropropyl phosphate, tris(dichloropropyl) phosphate, and bis(chloropropyl)monooctyl phosphate. Among these, phosphoric acid ester compounds and condensed phosphoric acid ester compounds are preferred.

Among these, particularly preferred are condensed phosphoric acid ester compounds represented by the general formula (1) below:

[Formula 1]

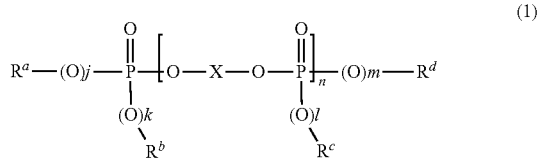

(1)

(wherein $R^a$, $R^b$, $R^c$, and $R^d$ each independently represent an aryl group, and one or more hydrogen atoms may be substituted or not be substituted; n is a natural number, X is an aromatic group derived from divalent phenols, and j, k, l, and m are each independently 0 or 1.)

Among these, most preferred are condensed phosphoric acid ester compounds represented by the general formula (2) below:

[Formula 2]

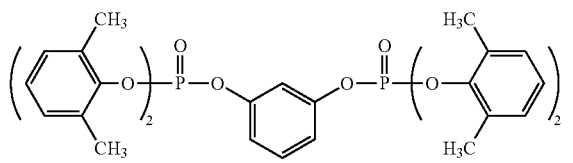

(2)

Use of the flame retardant (D) represented by the formula (2) can provide a composition having the flame retardancy, mechanical strength, heat resistance, and designability in a particularly good balance.

Examples of red phosphorus include ordinary red phosphorus; red phosphorus whose surface is in advance coated with a coating film of a metal hydroxide selected from aluminum hydroxide, magnesium hydroxide, zinc hydroxide, and titanium hydroxide; red phosphorus whose surface is coated with a coating film formed of a metal hydroxide selected from aluminum hydroxide, magnesium hydroxide, zinc hydroxide, and titanium hydroxide and a thermosetting resin; and red phosphorus whose surface is doubly coated with a coating film of a metal hydroxide selected from aluminum hydroxide, magnesium hydroxide, zinc hydroxide, and titanium hydroxide and with a coating film of a thermosetting resin formed thereon.

Examples of the inorganic phosphoric acid salts include ammonium polyphosphate.

Examples of the halogen flame retardant include aromatic halogen compounds, halogenated aromatic vinyl-based polymers, halogenated cyanurate resins, halogenated polyphenylene ether, halogenated polyphenylene thioether, and halogenated alkyltriazine compounds and the like. Preferably, examples thereof include brominated bisphenol-based epoxy resins, brominated bisphenol-based phenoxy resins, brominated bisphenol-based polycarbonate resins, brominated polystyrene resins, brominated crosslinked polystyrene resins, brominated bisphenolcyanurate resins, brominated polyphenylene oxide, polydibromophenylene oxide, decabromodiphenyl oxide bisphenol condensate, (such as tetrabromobisphenol A, and oligomers thereof), and brominated alkyltriazine compounds and the like.

These can be used alone, or two or more thereof can be used in combination.

The amount of the flame retardant (D) to be added is 5 to 20 parts by mass, and more preferably 10 to 20 parts by mass based on 100 parts by mass of the resin composition (1). If the amount of the flame retardant (D) to be added is within the range, a resin having stable flame retardancy and high mechanical strength is obtained.

The styrene-based resin composition of the present invention preferably attains a falling dart impact 50% destruction energy according to JIS K7211-1976 of 4.0 J or more in a molded product article having a thickness of 2.5 mm. From the viewpoint of evaluation of products, the falling dart impact 50% destruction energy is more preferably 5.0 J or more, and particularly preferably 5.9 J or more. A higher falling dart impact 50% destruction energy is better considering the purpose of use of the composition according to the present invention, but the falling dart impact 50% destruction energy is preferably less than 10 J due to a balance with other requirements. In order to attain the falling dart impact 50% destruction energy of 4.0 J or more, the reduced viscosity (ηsp/c) of the copolymer (B) is preferably 0.3 to 1.0 dl/g, more preferably 0.35 to 1.0 dl/g, still more preferably 0.35 to 0.8 dl/g, and particularly preferably 0.40 to 0.8 dl/g. Similarly, in order to attain the falling dart impact 50% destruction energy of 4.0 J or more, the reduced viscosity of the component (C) is preferably 0.18 to 0.8 dl/g, more preferably 0.20 to 0.8 dl/g, still more preferably 0.25 to 0.80 dl/g, and particularly preferably 0.30 to 0.65 dl/g. The reduced viscosity is obtained by measuring a flow time of a solution in a Cannon-Fenske type capillary tube at 30° C., wherein the solution being prepared by dissolving 0.50 g of the copolymer (B) or 0.50 g of the component (C) in 100 ml of 2-butanone.

As a preferred method for molding the molded product having a thickness of 2.5 mm, molding is performed at a setting temperature of 220° C. and a metal mold temperature of 60° C. by using an injection molding machine. A preferred shape of the molded article is a flat plate of 50 mm×90 mm×2.5 mm. The falling dart impact 50% destruction energy is evaluated according to JIS K7211-1976. A ball type 2 (mass: 1±0.05 kg, shape: diameter of approximately 63 mm) is used as a weight. The 50% destruction height is determined under an environment of a temperature of 23° C. and a humidity of 50±5% using 20 test pieces, and converted to an energy.

Specifically, the calculation is performed from the equations (3) and (4):

$$H_{50}(50\% \text{ destruction height}) = H_1 + d[\Sigma(i \times ni)/N \pm \tfrac{1}{2}] \quad (3), \text{ and}$$

$$E_{50}(50\% \text{ destruction energy}) = m \times g \times H_{50} \quad (4).$$

Into the equations, $H_1$: a test height (cm) at a height level (i) of 0,
d: a height interval (cm) when the test height is raised or lowered,
i: a height level set to 0 at $H_1$, and incremented or decremented by 1,
ni: the number of test pieces broken (or not broken) at each level,
N: the total number of test pieces broken (or not broken),
m: the weight (kg) of the weight, and
g: gravitational acceleration (9.80665 m/S$^2$) are substituted, and calculation is performed.

In the present invention, measurement and calculation were performed at $H_1$=60 cm, d=2.5 cm, and m=1 kg.

The styrene-based resin composition of the present invention has high weld strength. The weld strength here is obtained as follows. Using injection molding, molded products are produced by injecting the resin from a single gate and two gates, respectively, into an ISO dumbbell (thickness of 4 mm) The tensile strength of the obtained molded products is evaluated according to ISO527-1. The weld strength is calculated from two gates (tensile strength)/single gate (tensile strength)×100%. The styrene-based resin composition according to the present invention has a weld strength of 60% or more, preferably 80% or more.

As the aromatic polycarbonate (E), those produced by a known method can be used. Specifically, usable are those produced by a known method for reacting an aromatic dihydroxy compound with a carbonate precursor such as an interface polymerization method in which an aromatic dihydroxy compound is reacted with a carbonate precursor (for example, phosgene) in the presence of a sodium hydroxide aqueous solution and a methylene chloride solvent (for example, a phosgene method), and a transesterification method (the melting method) in which an aromatic dihydroxy compound is reacted with a carbonic diester (for example, diphenyl carbonate), etc, and those produced by a method for solid phase polymerizing a crystallized carbonate prepolymer obtained by the phosgene method or the melting method (JP 1-158033 A, JP 1-271426 A, JP 3-68627 A, and the like) can also be used.

The weight average molecular weight (Mw) of the aromatic polycarbonate can be measured using gel permeation chromatography (GPC). The measurement condition is as follows. Namely, tetrahydrofuran is used as a solvent, and a polystyrene gel is used. The weight average molecular weight (Mw) of the aromatic polycarbonate is determined using a molecular weight calibration curve converted from a standard monodisperse polystyrene calibration curve by the following equation:

$$M_{pc} = 0.3591 M_{ps}^{1.0388}$$

(wherein $M_{pc}$ is the molecular weight of aromatic polycarbonate, and $M_{ps}$ is the molecular weight of polystyrene)

Two or more aromatic polycarbonates each having a different molecular weight can be used in combination.

The content of the aromatic polycarbonate (E) in the resin composition (1) is preferably 1 to 17% by mass, more preferably 1 to 12% by mass, and particularly preferably 4 to 10% by mass. If a content of the aromatic polycarbonate (E) is within this range, a resin having stable flame retardancy and high color developability is obtained.

From the viewpoint of the flame retardancy and the transparency, the content of the aromatic polycarbonate (E) preferably varies depending on the weight average molecular weight Mw. For example, the relationship between the weight average molecular weight Mw and the content G (% by mass) preferably satisfies the following expressions (5) and (6). More preferable is a range surrounded by trapezoids that satisfy the expressions (5) and (7), and most preferable is a range surrounded by trapezoids that satisfy the expressions (5) and (8).

$$13{,}000 \leq Mw \leq 30{,}000 \quad (5)$$

$$1 \leq G \leq -2.9 \times 10^{-4} \times Mw + 20.824 \quad (6)$$

$$4 \leq G \leq -2.9 \times 10^{-4} \times Mw + 20.824 \quad (7)$$

$$4 \leq G \leq -2.9 \times 10^{-4} \times Mw + 17.824 \quad (8)$$

To the styrene-based resin composition of the present invention, a colorant (F) can be added in order to give the designability. Examples of the colorant (F) include inorganic pigments, organic pigments, metallic pigments, and dyes. Examples of the inorganic pigments include titanium oxide, carbon black, titanium yellow, iron oxide-based pigments, ultramarine, cobalt blue, chromium oxide, spinel green, lead chromate-based pigments, and cadmium-based pigments.

Examples of the organic pigments include azo-based pigments such as azo lake pigments, benzimidazolone pigments, diarylide pigments, and condensed azo pigments; phthalocyanine-based pigments such as phthalocyanine blue and phthalocyanine green; and condensed polycyclic pigments such as isoindolinone pigments, quinophthalone pigments, quinacridone pigments, perylene pigments, anthraquinone pigments, perinone pigments, and dioxazine violet.

Examples of the metallic pigments include flake aluminum metallic pigments, spherical aluminum pigments used to improve the weld appearance, mica powder for pearl-like metallic pigments, and other polyhedral particles of an inorganic substance such as glass coated with a metal by plating or spattering.

Examples of the dyes include nitroso dyes, nitro dyes, azo dyes, stilbene azo dyes, keto imine dyes, perinone dyes, triphenylmethane dyes, xanthene dyes, acridine dyes, quinoline dyes, methine/polymethine dyes, thiazole dyes, indamine/indophenol dyes, azine dyes, oxazine dyes, thiazine dyes, sulfide dyes, aminoketone/oxyketone dyes, anthraquinone dyes, indigoid dyes, and phthalocyanine dyes.

These colorants can be used alone, or two or more thereof can be used in combination.

Among these, a combination of three or more dyes is preferable. For example, in the case where a jet-black tone is given, use of dyes of three primary colors is preferred. Among these, a combination of a perinone dye, a quinoline dye, and an anthraquinone dye is preferable.

The styrene-based resin composition of the present invention has high color developability. The color developability here means an excellent effect in which a desired color tone is easy to obtain in coloring using the colorant (F). "Easy to obtain a desired color tone" specifically means that it is easy to obtain L*, a*, and b* (measurement according to JIS Z8729) for a target color tone, and no great difference in the color tone is apparently found. For example, in the case where a blacker color tone is desired, it is desired that L* is smaller. Usually, in the case where the jet-blackness is demanded, L* is preferably 11 or less, and more preferably 9 or less. In the case where a high whiteness is desired, it is desired that L* is larger. In the case where standard pure white is demanded, L* is preferably 90 or more, and more preferably 95 or more. As the resin having such high color developability, preferred are resins that can use a wider range of the colorant, and has a high total light transmittance in a natural color of the resin.

As a method for mixing the styrene-based resin composition according to the present invention, a known melt mixing method can be used. Specifically, examples thereof include batch type kneading machines such as a mixing roll, a Banbury mixer, and a pressure kneader; and continuous kneading machines such as a single screw extruder and a twin screw extruder.

Examples of the order of kneading include a method for kneading the total amount in batch, or a method for producing a masterbatch containing the flame retardant (D) or the aromatic polycarbonate (E) in a high concentration, and subsequently diluting the masterbatch. Preferred are a batch kneading method in which only the flame retardant (D) is separately fed, and a method for producing a masterbatch in which a combination of the copolymer (B) and the component (C) or a combination of the copolymer (B), the component (C), and the aromatic polycarbonate (E) is kneaded in advance, and subsequently the graft copolymer (A) and the flame retardant (D) are added. By these methods, a composition which excels in flame retardancy, mechanical strength, and transparency can be obtained.

The resin molded article according to the present invention is obtained by a known method usually used for molding thermoplastic resins such as injection molding, injection compression molding, extrusion molding, blow molding, inflation molding, vacuum molding, and press molding methods. Among these, injection molding and injection compression molding are preferable. Heat cycle molding in which a metal mold temperature is raised and cooled in a short time in the injection molding is most preferable.

In the injection molding, from the viewpoint of transferability to the surface of the cavity, molding is performed by adjusting the metal mold temperature at preferably 50 to 90° C., and more preferably 60 to 90° C. If the cavity surface temperature is high, the time to cool is longer. Accordingly, use of the heat cycle molding method for heating and cooling the cavity surface in a short time is preferred.

In the present invention, according to the purpose, additives can be compounded in any proportion: for example, a plasticizer, a lubricant (such as higher fatty acids and metal salts thereof, and higher fatty acid amides), a heat stabilizer, an antioxidant (for example, phenol-based antioxidants, phosphite-based antioxidants, thiodibropropionic acid ester type thioethers), a weathering agent (such as benzotriazole-based weathering agents, benzophenone-based weathering agents, salicylate-based weathering agents, cyanoacrylate-based weathering agents, oxalic acid derivatives, hindered amine-based weathering agents), flame retardant aids (such as antimony trioxide and antimony pentoxide), an antistatic agent (such as polyamide elastomers, quaternary ammonium salt-based antistatic agents, pyridine derivatives, aliphatic sulfonic acid salts, aromatic sulfonic acid salts, aromatic sulfonic acid salt copolymers, sulfuric acid ester salts, polyhydric alcohol partial esters, alkyldiethanolamine, alkyldiethanolamide, polyalkylene glycol derivatives, betaine-based antistatic agents, and imidazoline derivatives), an antibacterial agent, a fungicide, a slidability improver (for example, hydrocarbon-based slidability improvers such as low molecular weight polyethylenes, higher alcohols, polyhydric alcohols, polyglycols, polyglycerols, higher fatty acids, higher fatty acid metal salts, fatty acid amides, esters of a fatty acid and an aliphatic alcohol, full esters or partial esters of a fatty acid and a polyhydric alcohol, full esters or partial esters of a fatty acid and polyglycol, silicone-based slidability improvers, and fluorinated resin-based slidability improvers).

Moreover, in order to give the designability, a known colorant such as inorganic pigments, organic pigments, metallic pigments, and dyes can be added.

EXAMPLES

Examples and Comparative Examples below are for more specifically describing the present invention.

Evaluation and measurement in Examples were performed according to the following methods.

(1) Notched Charpy Impact Strength ($kJ/m^2$)

The notched Charpy impact strength was evaluated according to ISO179.

(2) Flexural Modulus (MPa)

The flexural modulus was evaluated according to ISO178.

(3) Weld Strength

Using injection molding, molded products were produced by injecting the resin from a single gate and two gates into an ISO dumbbell (thickness of 4 mm). The tensile strength of the obtained molded products was evaluated according to ISO527-1. The weld strength was calculated from two gates (tensile strength)/single gate (tensile strength)×100%.

If the weld strength was less than 60%, it was considered fail (×). If the weld strength was 60% or more and less than 80%, it was considered fair (Δ). If the weld strength was 80% or more, it was considered good (○).

(4) Falling Dart Impact Resistance (J)

Using an injection molding machine, a flat plate measuring 5 cm×9 cm and having a thickness of 2.5 mm was produced at a cylinder temperature of 220° C. and a metal mold temperature of 60° C. The 50% destruction energy was evaluated according to JIS K7211-1976.

If it was less than 4.0 J, it was considered fail (×). If it was 4.0 J or more, it was considered good (○).

(5) Color Developability

Using an injection molding machine, a flat plate measuring 5 cm×9 cm and having a thickness of 2.5 mm was produced at a cylinder temperature of 220° C. and a metal mold temperature of 60° C. L* was measured according to JIS Z8729, and jet-blackness was evaluated.

If L* was more than 11, it was considered fail (×). If L* was more 9 and 11 or less, it was considered fair (Δ). If L* was 9 or less, it was considered good (○).

(6) Flame Retardancy

The flame retardancy was evaluated according to UL-94. (thickness of 1.6 mm)

Absolutely dry condition: a test piece was treated at 70° C. for 168 hours, and cooled for 4 hours or more in a desiccator including silica gel, and a burning test was performed.

Wet condition: a test piece was left under an atmosphere of 23° C. and 50% humidity for 30 days, and a burning test was performed.

If the test piece passed the tests both in the absolutely dry condition and the wet condition, it was considered good (○). If the test piece did not pass the test in any one of the absolutely dry condition and the wet condition, it was considered fail (×).

(7) Proportion of Unit Component Derived From the Aromatic Vinyl-Based Monomer (Bs) in copolymer (B)

The copolymer (B) was formed into a film of 0.01 to 0.08 μm by compression molding. Using an FT/IR-7000 made by JASCO Corporation, the absorbance (A1) at 2262 cm$^{-1}$, the peak absorbance (A2) at 2238 to 2242 cm$^{-1}$, the absorbance (A3) at 2222 cm$^{-1}$, the absorbance (E1) at 1792 cm$^{-1}$, the peak absorbance (E2) at 1734 to 1738 cm$^{-1}$, the absorbance (E3) at 1661 cm$^{-1}$, the absorbance (S1) at 1617 cm$^{-1}$, the peak absorbance (S2) at 1600 to 1606 cm$^{-1}$, and the absorbance (S3) at 1575 cm$^{-1}$ were detected, and the proportion (Bs) was determined by the following equation (I):

$$Bs=1.0/(A+E+1.0)\times100 \quad \text{Equation (I)},$$

wherein $A=AA/SS\times0.27599$ $E=EE/SS\times0.0438+0.005$ $AA=A2-(A1-A3)\times$(wave number of $A2$-wave number of $A3$)/(wave number of $A1$-wave number of $A3$)-$A3$ $SS=S2-(S1-S3)\times$(wave number of $S2$-wave number of $S3$)/(wave number of $S1$-wave number of $S3$)-$S3$ $EE=E2-(E1-E3)\times$(wave number of $E2$-wave number of $E3$)/(wave number of $E1$-wave number of $E3$)-$E3$ (8) Proportion of Unit Component Derived From Aromatic Vinyl-Based Monomer (As) in Components of Graft Copolymer (A) From Which Diene-Based Rubbery Polymer Components are Excluded The graft copolymer (A) was formed into a film of 0.01 to 0.08 μm by compression molding. Using an FT/IR-7000 made by JASCO Corporation, A1, A2, A3, S1, S2, and S3 were detected, and the proportion (As) was determined by the following expression (II):

$$As=1.0/(A+1.0)\times100 \quad \text{Equation (II)},$$

wherein $A=AA/SS\times0.27599$ $AA=A2-(A1-A3)\times$(wave number of $A2$-wave number of $A3$)/(wave number of $A1$-wave number of $A3$)-$A3$ $SS=S2-(S1-S3)\times$(wave number of $S2$-wave number of $S3$)/(wave number of $S1$-wave number of $S3$)-$S3$ (Graft Copolymer A)
<Production of Diene-Based Rubbery Polymer>
<Production of Polybutadiene Rubber Latex>

Nine hundred and fifty parts by mass of a butadiene monomer, 50 parts by mass of acrylonitrile, 135 parts by mass of deionized water (concentration of iron: less than 0.02 ppm), 3.0 parts by mass of potassium oleate, 0.3 parts by mass of potassium persulfate, 0.2 parts by mass of tertiary dodecyl mercaptan, and 0.18 parts by mass of potassium hydroxide were placed in a pressure-resistant container with a stirrer. The temperature was raised to 70° C., and polymerization was started. The polymerization was performed for 15 hours to obtain a polybutadiene latex having a volume average particle size of 80 nm measured by a Microtrack particle size analyzer "nanotrac 150" (trade name) made by NIKKISO CO., LTD. and a solid content of 40% by mass.

To this obtained polybutadien latex, 0.1 parts by mass of an emulsifier:

[Formula 3]

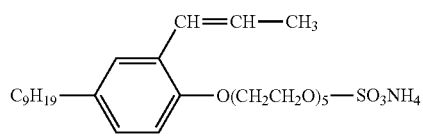

(9)

was added based on 100 parts by mass of the solid content in the latex, and the latex was stirred for 5 minutes. Then, 0.65 parts by mass of acetic acid was added. Subsequently, 0.65 parts by mass of potassium hydroxide was added to obtain a stable latex. The latex was a latex having particle size distribution with the volume average particle size of 250 nm without forming a coagulum, and was an aggregated latex having a high concentration of the solid content of 37% by mass. The mass distribution rate of the latex having a particle size of 350 nm or more was 11% by mass.

<Production of Graft Copolymer (A-1)>

To 135 parts by mass of the polybutadiene rubber latex produced above, 0.1 parts by mass of tertiary dodecyl mercaptan and 15 parts by mass of deionized water (the concentration of iron: less than 0.02 ppm) were added, a gaseous phase was replaced by nitrogen, then an aqueous solution prepared by dissolving 0.06 parts by mass of sodium formaldehyde sulfoxylate, 0.0008 parts by mass of ferrous sulfate, and 0.02 parts by mass of ethylenediaminetetraacetic acid disodium salt in 25 parts by mass of deionized water was added, and the temperature was raised to 55° C. Subsequently, while the temperature was raised over 1.5 hours to 70° C., a monomer mixed solution consisting of 10 parts by mass of acrylonitrile, 40 parts by mass of styrene, 0.4 parts by mass of tertiary dodecyl mercaptan, and 0.15 parts by mass of cumene hydroperoxide, and an aqueous solution prepared by dissolving 0.035 parts by mass of sodium formaldehyde sulfoxylate in 25 parts by mass of deionized water were added over 4 hours. After the addition was completed, 0.02 parts by mass of cumene hydroperoxide was added. While the reaction tank was controlled at 70° C. for another 1 hour, the polymerization reaction was completed.

A silicone resin antifoaming agent and a phenol-based antioxidant emulsion were added to the thus-obtained ABS latex, and deionized water was added thereto and adjusted so that the concentration of the solid content was 10% by mass. The latex was heated to 70° C., and an aluminium sulfate aqueous solution was added thereto to solidify the latex. The obtained product was subjected to solid liquid separation by a screw press. The moisture content at this time was 10% by mass. The obtained product was dried to obtain Graft Copolymer (A-1).

The Graft Copolymer (A-1) consisted of 10% by mass of acrylonitrile, 50% by mass of butadiene, and 40% by mass of styrene, wherein the graft rate was 46% by mass, the reduced viscosity of the non-grafted components (a content soluble in acetone) (0.50 g/100 ml, in the 2-butanone solution, measured at 30° C.) was 0.31 dl/g.

<Production of Graft Copolymer (A-2)>

By the same method as that in the case of Production of Copolymer (A-1), Graft Copolymer (A-2) consisting of 12.5% by mass of acrylonitrile, 50% by mass of butadiene, and 37.5% by mass of styrene was obtained. This Graft Copolymer (A-2) has the graft rate of 46% by mass, and the reduced viscosity of the non-grafted components (a content soluble in acetone) (0.50 g/100 ml, in the 2-butanone solution, measured at 30° C.) of 0.33 dl/g.

<Production of Styrene Butadiene Rubber Latex>

Nine hundred and fifty parts by mass of a butadiene monomer, 50 parts by mass of styrene, 135 parts by mass of deionized water (the concentration of iron: less than 0.02 ppm), 3.0 parts by mass of potassium oleate, 0.3 parts by mass of potassium persulfate, 0.2 parts by mass of tertiary dodecyl mercaptan, and 0.18 parts by mass of potassium hydroxide were placed in a pressure-resistant container with a stirrer. The temperature was raised to 60° C., and polymerization was started. The polymerization was performed for 15 hours to obtain a styrene butadiene rubber latex having a volume average particle size of 80 nm measured by a Microtrack particle size analyzer "nanotrac 150" (trade name) made by NIK-KISO CO., LTD. and a solid content of 40% by mass.

To this obtained styrene butadiene rubber latex, 0.1 parts by mass of an emulsifier represented by the formula (9) was added based on 100 parts by mass of the solid content in the latex, and the obtained mixture was stirred for 5 minutes. Then, 0.65 parts by mass of acetic acid was added. Subsequently, 0.65 parts by mass of potassium hydroxide was added to obtain a stable latex. The latex was a latex having particle size distribution with the volume average particle size of 250 nm without forming a coagulum, and was a condensed styrene butadiene rubber latex having a high concentration of the solid content of 37% by mass. The mass distribution rate of the latex having a particle size of 350 nm or more was 11% by mass.

<Production of Graft Copolymer (A-3)>

To 135 parts by mass of the styrene butadiene rubber latex produced above, 0.1 parts by mass of tertiary dodecyl mercaptan and 15 parts by mass of deionized water (the concentration of iron: less than 0.02 ppm) were added, a gaseous phase was replaced by nitrogen, then an aqueous solution prepared by dissolving 0.06 parts by mass of sodium formaldehyde sulfoxylate, 0.0008 parts by mass of ferrous sulfate, 0.02 parts by mass of ethylenediaminetetraacetic acid disodium salt in 25 parts by mass of deionized water was added thereto, and the temperature was raised to 55° C. Subsequently, while the temperature was raised over 1.5 hours to 70° C., a monomer mixed solution consisting of 10 parts by mass of acrylonitrile, 40 parts by mass of styrene, 0.4 parts by mass of tertiary dodecyl mercaptan, and 0.15 parts by mass of cumene hydroperoxide, and an aqueous solution prepared by dissolving 0.035 parts by mass of sodium formaldehyde sulfoxylate in 25 parts by mass of deionized water were added over 4 hours. After the addition was completed, 0.02 parts by mass of cumene hydroperoxide was added. While the reaction tank was controlled at 70° C. for another 1 hour, the polymerization reaction was completed.

A silicone resin antifoaming agent and a phenol-based antioxidant emulsion were added to the thus-obtained ABS latex, and deionized water was added thereto and adjusted so that the concentration of the solid content was 10% by mass. The latex was heated to 70° C., and an aluminium sulfate aqueous solution was added to solidify the latex. The obtained product was subjected to solid liquid separation by a screw press. The moisture content at this time was 10% by mass. The obtained product was dried to obtain Graft Copolymer (A-3).

The Graft Copolymer (A-3) consisted of 10% by mass of acrylonitrile, 50% by mass of butadiene, and 40% by mass of styrene, wherein the graft rate was 46% by mass, the reduced viscosity of the non-grafted components (a content soluble in acetone) (0.50 g/100 ml, in the 2-butanone solution, measured at 30° C.) was 0.31 dl/g.

(Copolymer B)

<Production of Copolymer (B-1)>

According to the method in Example 1 described in Japanese Patent No. 1960531, a mixed solution of acrylonitrile and styrene, and secondary butyl alcohol as a solvent was prepared, and continuously added to a polymerization reactor. The temperature of the reactor was controlled from 140 to 160° C,. to make a polymerization reaction.

Subsequently, the non-reacted monomer was removed under vacuum to obtain solid powder of Copolymer (B-1). Copolymer (B-1) consisted of 20% by mass of acrylonitrile and 80% by mass of styrene, wherein the reduced viscosity was 0.75 dl/g.

<Production of Copolymer (B-2)>

By the same method as that in the case of Copolymer (B-1), Copolymer (B-2) was obtained. Copolymer (B-2) consisted of 25% by mass of acrylonitrile and 75% by mass of styrene, wherein the reduced viscosity was 0.75 dl/g.

<Production of Copolymer (B-3)>

By the same method as that in the case of Copolymer (B-1), Copolymer (B-3) was obtained. Copolymer (B-3) consisted of 30% by mass of acrylonitrile and 70% by mass of styrene, wherein the reduced viscosity was 0.67 dl/g.

(Copolymer C)

<Production of Copolymer (C-1)>

To a monomer mixture comprising 68.6 parts by mass of methyl methacrylate, 1.4 parts by mass of methyl acrylate and 30 parts by mass of ethylbenzene, 0.015 parts by mass of 1,1-di-t-butylperoxy-3,3,5-trimethylcyclohexane and 0.15 parts by mass of n-octylmercaptan were added and uniformly mixed. The solution was continuously fed to an airtight pressure-resistant reactor having an inner volume of 10 L, and polymerized under stirring at an average temperature of 135° C. for an average residence time of 2 hours. The obtained product was continuously fed to a storage tank connected to the reactor, and introduced to a volatile content removing apparatus kept at 260° C. and a high vacuum of 10 mmHg to devolatilize and recover the non-reacted monomer and the solvent, and further continuously transferred to an extruder in a molten state. Here, lauric acid and stearyl alcohol were quantitatively fed at 90° C. in a molten state from an additive inlet port connected to the extruder to obtain pellets of Copolymer (C-1). The reduced viscosity of the obtained copolymer was 0.35 dl/g. The composition was analyzed using a proton NMR method, and a result that methyl methacrylate unit/methyl acrylate unit=98.0/2.0 (mass ratio) was obtained. Further, the amounts of lauric acid and stearyl alcohol in the resin composition were determined, and found out that the amount of lauric acid was 0.03 parts by mass and that of stearyl alcohol was 0.1 parts by mass based on 100 parts by mass of the resin composition.

<Production of Copolymer (C-2))>

By the same method as that in the case of production of Copolymer (C-1), Copolymer (C-2) was obtained wherein methyl methacrylate unit/methyl acrylate unit=86.5/13.5 (weight ratio), and the reduced viscosity was 0.32 dl/g.

(Flame Retardant D)

As the flame retardant, the followings were used:

Flame Retardant (D-1): "PX200" made by DAIHACHI CHEMICAL INDUSTRY CO., LTD. (1,3-phenylenebis(2,6-dimethylphenyl=phosphate))

[Formula 4]

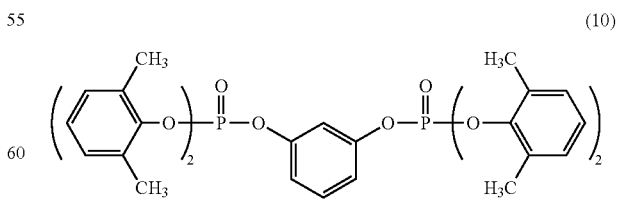

(10)

Flame Retardant (D-2): "CR-741" made by DAIHACHI CHEMICAL INDUSTRY CO., LTD. α-diphenoxyphosphoryl-ω-phenoxypoly (n=1 to 3)[oxy-1,4-phenyleneisopropylidene-1,4-phenyleneoxy(phenoxyphosphoryl)]

[Formula 5]

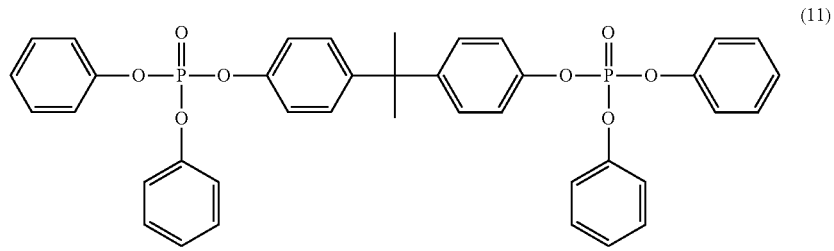

(11)

(Copolymer E)
<Production of Aromatic Polycarbonate (E-1)>
Aromatic Polycarbonate (E-1) was a bisphenol A-based polycarbonate produced from bisphenol A and diphenyl carbonate by melt transesterification, and contained 400 ppm of octadecyl-3-(3,5-di-t-butyl-4-hydroxyphenyl)propionate as a hindered phenol-based antioxidant and 200 ppm of tris(2,4-di-t-butylphenyl) phosphite as a phosphite-based heat stabilizer.

The weight average molecular weight (Mw)=15,000, and the phenolic terminal group ratio (proportion of the phenolic terminal group to the number of the total terminal groups)=29 mol %.

<Production of Aromatic Polycarbonate (E-2)>
By the same method as that in the case of Aromatic Polycarbonate (E-1), Aromatic Polycarbonate (E-2) was obtained. The weight average molecular weight (Mw) was 26,000, and the phenolic terminal group ratio was 25 mol %.

(Colorant F)
As the colorant, the followings were used:
Colorant (F-1): Solvent Red 179 (perinone-based dye)
Colorant (F-2): Disperse Yellow 160 (quinoline-based dye)
Colorant (F-3): Solvent Violet 13 (anthraquinone-based dye)

Examples, Comparative Examples

The compounding composition in Table 1 sufficiently dried to remove moisture was mixed, then put into a hopper. While the flame retardant (F) was quantitatively put into the hopper using a quantitative feeder, the compounding composition was kneaded using a twin screw extruder (PCM-30, L/D=28, made by Ikegai Corp.) on the condition of a cylinder setting temperature of 260° C., the number of rotation of the screw of 200 rpm, and a discharge rate of the kneaded resin of 12 kg/hr to obtain resin pellets, and the respective properties were evaluated. The result of evaluation is shown in Table 1.

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Graft copolymer (A) | A-1 (parts by mass) | 30 | 40 | 30 | 40 | 40 | 40 | 40 | 30 | 50 |
|  | A-2 (parts by mass) |  |  |  |  |  |  |  |  |  |
|  | A-3 (parts by mass) |  |  |  |  |  |  |  |  |  |
| Copolymer (B) | B-1 (parts by mass) | 35 | 21 | 35 | 25 |  | 25 | 25 | 45 | 25 |
|  | B-2 (parts by mass) |  |  |  |  | 25 |  |  |  |  |
|  | B-3 (parts by mass) |  |  |  |  |  |  |  |  |  |
| Copolymer (C) | C-1 (parts by mass) | 35 | 39 | 30 | 30 | 30 | 30 | 30 | 15 | 15 |
|  | C-2 (parts by mass) |  |  |  |  |  |  |  |  |  |
| Aromatic polycarbonate (E) | E-1 (parts by mass) |  |  | 5 | 5 | 5 |  | 5 | 10 | 10 |
|  | E-2 (parts by mass) |  |  |  |  |  | 5 |  |  |  |
| Proportion of rubbery polymer in resin composition (1) (% by mass) |  | 15 | 20 | 15 | 20 | 20 | 20 | 20 | 15 | 25 |
| Flame retardant (D) | D-1 (parts by mass) | 13 | 13 | 13 | 13 | 13 | 15 |  | 12 | 8 |
|  | D-2 (parts by mass) |  |  |  |  |  |  | 13 |  |  |
| Colorant (F) | F-1 (parts by mass) | 0.2 | 0.2 | 0.2 | 0.2 | 0.2 | 0.2 | 0.2 | 0.2 | 0.2 |
|  | F-2 (parts by mass) | 0.05 | 0.05 | 0.05 | 0.05 | 0.05 | 0.05 | 0.05 | 0.05 | 0.05 |
|  | F-3 (parts by mass) | 0.25 | 0.25 | 0.25 | 0.25 | 0.25 | 0.25 | 0.25 | 0.25 | 0.25 |
| Proportion of aromatic vinyl-based monomer (As) |  | 80 | 80 | 80 | 80 | 80 | 80 | 80 | 80 | 80 |
| Proportion of aromatic vinyl-based monomer (Bs) |  | 80 | 80 | 80 | 80 | 75 | 80 | 80 | 80 | 80 |
| Difference between proportions of aromatic vinyl-based monomer (|As-Bs|) |  | 0 | 0 | 0 | 0 | 5 | 0 | 0 | 0 | 0 |
| Charpy impact strength (kJ/m$^2$) |  | 14 | 16 | 16 | 18 | 20 | 18 | 15 | 10 | 27 |
| Flexural modulus (MPa) |  | 2,600 | 2,400 | 2,600 | 2,400 | 2,400 | 2,400 | 2,400 | 2,400 | 2,200 |
| Weld strength |  | ◯ 85% | ◯ 82% | ◯ 83% | ◯ 86% | ◯ 85% | ◯ 84% | ◯ 84% | ◯ 82% | ◯ 83% |
| Falling dart impact 50% destruction energy (J) |  | ◯ 6.3 | ◯ 6.0 | ◯ 6.3 | ◯ 6.4 | ◯ 6.9 | ◯ 6.5 | ◯ 6.1 | ◯ 5.9 | ◯ 8.8 |
| Color developability |  | ◯ 8.5 | ◯ 8.3 | ◯ 8.5 | ◯ 9.0 | ◯ 8.9 | ◯ 9.0 | ◯ 9.0 | ◯ 8.6 | ◯ 8.9 |
| Flame retardancy (thickness of 1.6 mm) | Wet condition | ◯ | ◯ | ◯ | ◯ | ◯ | ◯ | ◯ | ◯ | ◯ |
|  | Absolutely dry condition | ◯ | ◯ | ◯ | ◯ | ◯ | ◯ | ◯ | ◯ | ◯ |
|  | Determination | ◯ | ◯ | ◯ | ◯ | ◯ | ◯ | ◯ | ◯ | ◯ |

TABLE 1-continued

|  |  | Example 10 | Example 11 | Example 12 | Example 13 | Comparative Example 1 | Comparative Example 2 | Comparative Example 3 | Comparative Example 4 | Comparative Example 5 |
|---|---|---|---|---|---|---|---|---|---|---|
| Graft copolymer (A) | A-1 (parts by mass) | 40 |  | 30 |  | 25 | 22.5 | 40 | 25 | 55 |
|  | A-2 (parts by mass) |  | 30 |  |  |  |  |  |  |  |
|  | A-3 (parts by mass) |  |  |  | 30 |  |  |  |  |  |
| Copolymer (B) | B-1 (parts by mass) | 20 | 35 | 35 | 35 | 45 | 17.5 | 13 |  | 10 |
|  | B-2 (parts by mass) |  |  |  |  |  |  |  |  |  |
|  | B-3 (parts by mass) |  |  |  |  |  |  |  | 45 |  |
| Copolymer (C) | C-1 (parts by mass) | 30 | 35 |  | 35 | 30 | 50 | 47 | 30 | 30 |
|  | C-2 (parts by mass) |  |  | 35 |  |  |  |  |  |  |
| Aromatic polycarbonate (E) | E-1 (parts by mass) |  |  |  |  |  | 10 |  |  | 5 |
|  | E-2 (parts by mass) | 10 |  |  |  |  |  |  |  |  |
| Proportion of rubbery polymer in resin composition (1) (% by mass) |  | 20 | 15 | 15 | 15 | 12.5 | 11.25 | 20 | 12.5 | 27.5 |
| Flame retardant (D) | D-1 (parts by mass) | 13 | 13 | 13 | 13 | 12 | 14 | 12 | 12 | 15 |
|  | D-2 (parts by mass) |  |  |  |  |  |  |  |  |  |
| Colorant (F) | F-1 (parts by mass) | 0.2 | 0.2 | 0.2 | 0.2 | 0.2 | 0.2 | 0.2 | 0.2 | 0.2 |
|  | F-2 (parts by mass) | 0.05 | 0.05 | 0.05 | 0.05 | 0.05 | 0.05 | 0.05 | 0.05 | 0.05 |
|  | F-3 (parts by mass) | 0.25 | 0.025 | 0.025 | 0.05 | 0.25 | 0.25 | 0.25 | 0.25 | 0.25 |
| Proportion of aromatic vinyl-based monomer (As) |  | 80 | 75 | 80 | 80 | 80 | 80 | 80 | 80 | 80 |
| Proportion of aromatic vinyl-based monomer (Bs) |  | 80 | 80 | 80 | 80 | 80 | 80 | 80 | 70 | 80 |
| Difference between proportions of aromatic vinyl-based monomer (|As-Bs|) |  | 0 | 5 | 0 | 0 | 0 | 0 | 0 | 10 | 0 |
| Charpy impact strength (kJ/m$^2$) |  | 22 | 15 | 16 | 14 | 10 | 14 | 20 | 9 | 25 |
| Flexural modulus (MPa) |  | 2,400 | 2,600 | 2,600 | 2,500 | 2,500 | 2,600 | 2,400 | 2,500 | 2,200 |
| Weld strength |  | ○ 82% | ○ 83% | ○ 84% | ○ 84% | ○ 81% | X 59% | Δ 60% | Δ 75% | ○ 84% |
| Falling dart impact 50% destruction energy (J) |  | ○ 6.2 | ○ 6.3 | ○ 6.3 | ○ 6.3 | X 3.9 | X 2.5 | X 3.0 | X 3.4 | ○ 6.4 |
| Color developability |  | ○ 9.0 | ○ 8.9 | ○ 8.5 | ○ 8.3 | ○ 8.6 | ○ 8.4 | ○ 8.2 | X 11.5 | Δ 10.2 |
| Flame retardancy (thickness of 1.6 mm) | Wet condition | ○ | ○ | ○ | ○ | ○ | ○ | ○ | ○ | ○ |
|  | Absolutely dry condition | ○ | ○ | ○ | ○ | ○ | ○ | ○ | ○ | ○ |
|  | Determination | ○ | ○ | ○ | ○ | ○ | ○ | ○ | ○ | ○ |

As shown in Table 1, in the case where the conditions defined in the present invention are not satisfied, the effects of the present invention cannot be obtained. In contrast, in the styrene-based resin composition of the present invention, it turns out that excellent effects are obtained in the flame retardancy, falling dart impact resistance, weld strength, Charpy impact strength, color developability, and mechanical properties.

Industrial Applicability

Use of the styrene-based resin composition of the present invention can provide a resin molded article which excels in flame retardancy, falling dart impact resistance, weld strength, Charpy impact strength, color developability, and mechanical properties.

The invention claimed is:

1. A styrene-based resin composition comprising a resin composition (1) and 5 to 20 parts by mass of flame retardant (D) based on 100 parts by mass of the resin composition (1), wherein the resin composition (1) comprising 30 to 51% by mass of a graft copolymer (A) obtained by graft polymerizing a diene-based rubbery polymer with an aromatic vinyl-based monomer and an unsaturated nitrile monomer, 10 to 55% by mass of a copolymer (B) comprising two or more of monomers selected from the group consisting of aromatic vinyl-based monomers, unsaturated nitrile monomers, and unsaturated carboxylic acid alkyl ester monomers, and 15 to 39% by mass of a copolymer (C) comprising two or more unsaturated carboxylic acid alkyl ester monomers, and wherein a proportion of the diene-based rubbery polymer to the resin composition (1) is 15 to 25% by mass;
wherein the resin composition (1) further comprises 1 to 12% by mass of an aromatic polycarbonate (E), wherein (A)+(B)+(C)+(E) =100% by mass.

2. The styrene-based resin composition according to claim 1, wherein a falling dart impact-50% destruction energy according to JIS K7211-1976 of a molded product comprising said styrene-based resin composition and having a thickness of 2.5 mm is 4.0 J or more.

3. The styrene-based resin composition according to claim 1 or 2, wherein a proportion of a unit component derived from the aromatic vinyl-based monomer (As) in the components of the graft copolymer (A) from which the diene-based rubbery polymer components are excluded is 60 to 90% by mass, a proportion of a unit component derived from the aromatic vinyl-based monomer (Bs) in the copolymer (B) is 60 to 90% by mass, and a difference (|As−Bs|) between the proportion of the unit component derived from the aromatic vinyl-based monomer (As) and the proportion of the unit component derived from the aromatic vinyl-based monomer (Bs) is 0 to 5% by mass.

4. The styrene-based resin composition according to claim 1, wherein the component (C) is a copolymer obtained by copolymerizing a methyl methacrylate monomer and a methyl acrylate monomer.

5. The styrene-based resin composition according to claim 4, wherein a proportion of the methyl acrylate monomer contained in the copolymer (C) is 0.5 to 15% by mass.

6. A resin molded article comprising the styrene-based resin composition according to claim 1.

7. The resin molded article according to claim 6, wherein the resin molded article is molded at a metal mold temperature of 60 to 90° C.

* * * * *